(12) United States Patent
Lee

(10) Patent No.: US 9,035,590 B2
(45) Date of Patent: May 19, 2015

(54) MOTOR DRIVING APPARATUS AND METHOD

(71) Applicant: SAMSUNG ELECTRO-MECHANICS CO., LTD., Suwon, Gyunggi-do (KR)

(72) Inventor: Soo Woong Lee, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 81 days.

(21) Appl. No.: 13/830,386

(22) Filed: Mar. 14, 2013

(65) Prior Publication Data

US 2014/0145662 A1    May 29, 2014

(30) Foreign Application Priority Data

Nov. 26, 2012   (KR) .......................... 10-2012-0134540

(51) Int. Cl.
    *H02P 6/18*    (2006.01)
(52) U.S. Cl.
    CPC ................ *H02P 6/182* (2013.01); *H02P 6/185* (2013.01)
(58) Field of Classification Search
    CPC ..................................................... H02P 6/182
    USPC ............ 318/400.35, 400.34, 400.32, 400.01, 318/700
    See application file for complete search history.

(56) References Cited

U.S. PATENT DOCUMENTS

| 6,541,939 | B2 * | 4/2003 | Kishibe et al. | 318/799 |
| 7,294,988 | B2 * | 11/2007 | Ajima et al. | 318/712 |
| 7,514,894 | B2 * | 4/2009 | Hoogzaad | 318/599 |
| 8,278,860 | B2 * | 10/2012 | Brown | 318/400.35 |

FOREIGN PATENT DOCUMENTS

| JP | 7-222487 | 8/1995 |
| JP | 07-337077 | 12/1995 |
| JP | 2000-287480 A | 10/2000 |
| KP | 2011-0036979 | 4/2011 |
| KR | 10-0636795 B1 | 10/2006 |
| KR | 10-0885683 B1 | 2/2009 |

OTHER PUBLICATIONS

Korean Office Action with Full English Translation issued in Korean Patent Application No. 10-2012-0134540 mailed Nov. 26, 2013.
Japanese Office Action issued in Japanese Patent Application No. 2013-049565 dated Mar. 18, 2014, w/English translation.

* cited by examiner

*Primary Examiner* — David S Luo
(74) *Attorney, Agent, or Firm* — McDermott Will & Emery LLP

(57) ABSTRACT

There are provided a motor driving apparatus and method, the motor driving apparatus including: a filter controlling unit detecting a frequency of a pulse width modulation (PWM) signal and generating a control signal; a first filtering unit filtering a back electromotive force (BEMF) signal according to the control signal; a second filtering unit filtering a reference signal according to the control signal; and a comparing unit comparing output of the first and second filtering units and generating a motor rotor detection signal.

12 Claims, 4 Drawing Sheets

MOTOR DRIVING APPARATUS AND METHOD

CROSS-REFERENCE TO RELATED APPLICATIONS

This application claims the priority of Korean Patent Application No. 10-2012-0134540 filed on Nov. 26, 2012, in the Korean Intellectual Property Office, the disclosure of which is incorporated herein by reference.

BACKGROUND OF THE INVENTION

1. Field of the Invention

The present invention relates to a motor driving apparatus and method capable of effectively removing a noise signal included in a back electromotive force (BEMF) signal using a frequency of a pulse width modulation (PWM) signal, in detecting a position of a rotor using the BEMF signal, in a sensorless-type motor.

2. Description of the Related Art

In a motor driving apparatus that does not use a hall sensor, a position of a rotor may be detected using a zero crossing point of a back electromotive force (BEMF) signal. In order to detect the BEMF signal in an apparatus for driving a three phase motor, a BEMF voltage is measured in a floating phase. In this case, an output signal indicating the position of the rotor, similarly to an output signal of the hall sensor, may be obtained by using a zero crossing method of comparing the BEMF voltage rising and falling by 60 degrees with a predetermined reference voltage.

However, a BEMF signal detected by a general method may include noise due to various factors. Therefore, in the case in which the BEMF signal is compared with the reference voltage as it is, it may be difficult to find an accurate zero crossing point. Particularly, noise included in the BEMF signal may be a noise signal having a high frequency. Therefore, a method of detecting the BEMF signal that is not affected by the noise has been required.

Cited Reference 1 relates to a speed and position observer of a permanent magnet synchronous motor and discloses a method and apparatus of calculating BEMF of a motor to calculate a speed and a position of the motor. Cited Reference 2 relates to an apparatus for driving a brushless DC motor and discloses a configuration in which BEMF is detected based on a level of a voltage signal, similarly to the case in Cited Reference 1, and noise is distinguished using an amount of current in the case in which the level thereof is higher than a reference value. However, a configuration in which parameters for filtering a BEMF signal are determined by using a frequency of a pulse width modulation signal and a BEMF signal from which noise has been removed is obtained by using the parameters has not been disclosed in either of cited references 1 and 2.

RELATED ART DOCUMENT (Patent Document 1) Korean Utility Model Laid-Open Publication No. 10-2011-0036979
(Patent Document 2) Korean Patent No. 10-0636795

SUMMARY OF THE INVENTION

An aspect of the present invention provides a motor driving apparatus and method capable of determining parameters for filtering a BEMF signal, for example, a cut-off frequency, or the like, using a frequency of a pulse width modulation signal, and filtering the BEMF signal based on the determined parameters. Here, a zero crossing point is determined by comparing a BEMF signal from which noise has been removed with a reference signal, whereby an operational state of a motor may be more accurately determined.

According to an aspect of the present invention, there is provided a motor driving apparatus including: a filter controlling unit detecting a frequency of a pulse width modulation (PWM) signal and generating a control signal; a first filtering unit filtering a back electromotive force (BEMF) signal according to the control signal; a second filtering unit filtering a reference signal according to the control signal; and a comparing unit comparing output of the first and second filtering units and generating a motor rotor detection signal.

The first and second filtering units may have the same delay time.

The filter controlling unit may determine a cut-off frequency of at least one of the first and second filtering units based on the frequency of the pulse width modulation signal.

The second filtering unit may delay a direct current voltage or a neutral point voltage according to the control signal and output the reference signal delayed by the same amount as the output of the first filtering unit.

The comparing unit may compare the output of the first and second filtering units and output a zero crossing signal.

The first and second filtering units may include: a plurality of switching devices of which an on/off operation is controlled by the control signal; and at least one delay device connected to the plurality of switching devices.

According to another aspect of the present invention, there is provided a motor driving apparatus including: a filter controlling unit including a frequency detector detecting a frequency of a pulse width modulation (PWM) signal and a controller generating a switching control signal using the frequency of the pulse width modulation signal; and a filtering unit filtering a back electromotive force (BEMF) signal according to a cut-off frequency determined based on the control signal.

The filtering unit may include: a plurality of switching devices operated by the switching control signal; and at least one passive circuit device connected to the plurality of switching devices.

The controller may control turning-on or turning-off of each of the plurality of switching devices according to the frequency of the pulse width modulation signal.

According to another aspect of the present invention, there is provided a motor driving method including: detecting a frequency of a pulse width modulation (PWM) signal; generating a control signal based on the frequency of the pulse width modulation (PWM) signal; filtering a back electromotive force (BEMF) signal based on the control signal; and generating a zero crossing signal using a reference signal delayed based on the control signal and the filtered BEMF signal.

The generating of the zero crossing signal may be performed by comparing the delayed reference signal and the filtered BEMF signal with each other.

The reference signal may have the same delay time as that of the filtered BEMF signal.

The filtering of the BEMF signal may be performed by low pass filtering with respect to the BEMF signal using a cut-off frequency determined based on the control signal.

The filtering of the BEMF signal may include controlling an operation of each of the plurality of switching devices according to the control signal and determining the cut-off frequency.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
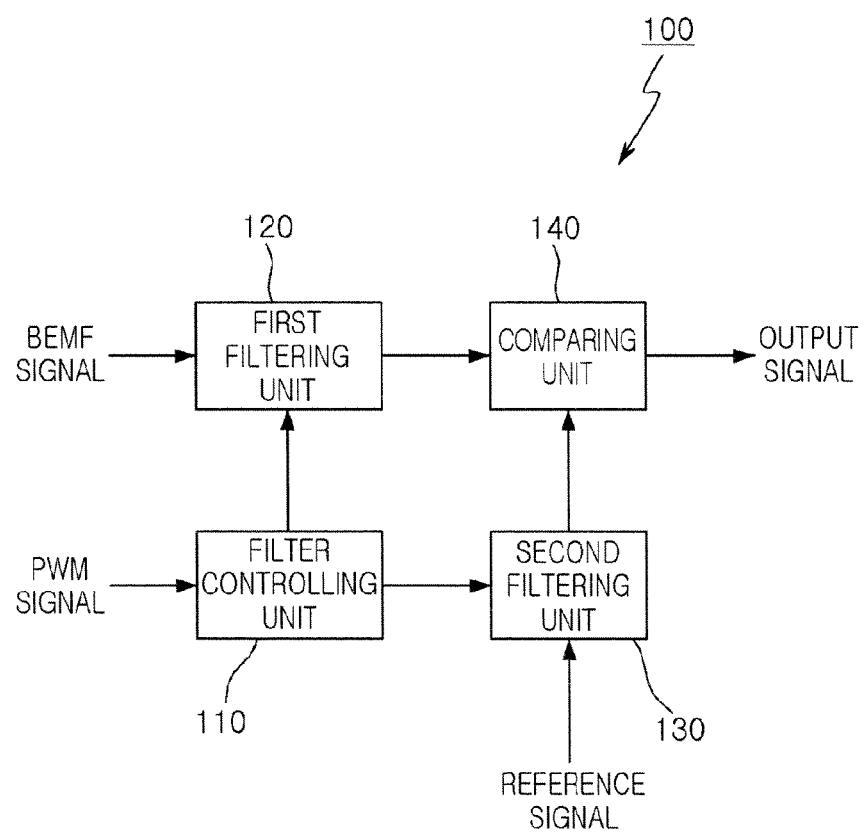
FIG. 1 is a block diagram illustrating a motor driving apparatus according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Throughout the drawings, the same reference numerals will be used to designate the same or like elements.

FIG. 1 is a block diagram illustrating a motor driving apparatus according to an embodiment of the present invention.

Referring to FIG. 1, a motor driving apparatus 100 according to the embodiment of the present invention may include a filter controlling unit 110, a first filtering unit 120, a second filtering unit 130, and a comparing unit 140. The first and second filtering units 120 and 130 may be band pass filters (BPF) having the same operational characteristics, particularly, low pass filters (LPF), and the operational characteristics of the first and second filtering units 120 and 130 may be determined by the filter controlling unit 110.

The filter controlling unit 110, the first filtering unit 120, and the second filtering unit 130 receive a pulse width modulation (PWM) signal, a back electromotive force (BEMF) signal, and a reference signal, respectively. The BEMF signal received by the first filtering unit 120, a signal for detecting a position of a motor rotor, may include various types of electrical noise in addition to switching noise of the PWM signal. The first filtering unit 120 may remove the electrical noise included in the BEMF signal, and the operational characteristics of the first filtering unit 120 required to remove the noise may be determined according to a control signal generated by the filter controlling unit 110.

The reference signal input to the second filtering unit 130 may be a direct current (DC) voltage for driving a motor or a neutral point voltage in the case of a three-phase motor. The operational characteristics of the second filtering unit 130 may also be determined according to the control signal generated by the filter controlling unit 110, similarly to the first filtering unit 120.

The filter controlling unit 110 may receive the pulse width modulation signal for operating the motor and generate the control signal required to control the first and second filtering units 120 and 130. For example, the filter controlling unit 110 may detect a frequency of the received pulse width modulation signal and determine cut-off frequencies of the first and second filtering units 120 and 130 based on the detected frequency. That is, the filter controlling unit 110 may determine filtering frequency bands of the first and second filtering units 120 and 130 based on the frequency of the pulse width modulation signal. In this case, the cut-off frequency of the first filtering unit 120 determined by the filter controlling unit 110 may be higher than the frequency of the pulse width modulation signal detected by the filter controlling unit 110, the reason for which will be described below.

As described above, the BEMF signal input to the first filtering unit 120 may include noise according to a switching operation of the pulse width modulation signal, and the like, and this electrical noise may be removed by the first filtering unit 120. Since a predetermined delay may be generated by the filtering operation in the BEMF signal from which the noise has been removed by the first filtering unit 120, in the case in which the BEMF signal filtered by the first filtering unit 120 is compared with the reference signal as it is, it may be difficult to accurately detect the position of the motor rotor. Therefore, in the embodiment of the present invention, the second filtering unit 130 imparting a predetermined delay to the reference signal may be used to thereby allow timings of the BEMF signal from which noise has been removed and the reference signal to coincide with each other. That is, in order to prevent an operation error of the comparing unit 140 caused due to the delay generated by the filtering operation of the first filtering unit 120, the second filtering unit 130 may have the same delay time as that of the first filtering unit 120.

The comparing unit 140 may compare output of the first and second filtering units 120 and 130 with each other to generate a final output signal. The BEMF signal input to the first filtering unit 120 may be measured in a voltage signal that is floated, and the comparing unit 140 may generate the output signal using a zero crossing method of comparing the voltage of the voltage signal rising and falling by 60 degrees with the voltage of the reference signal.

Figure 2:
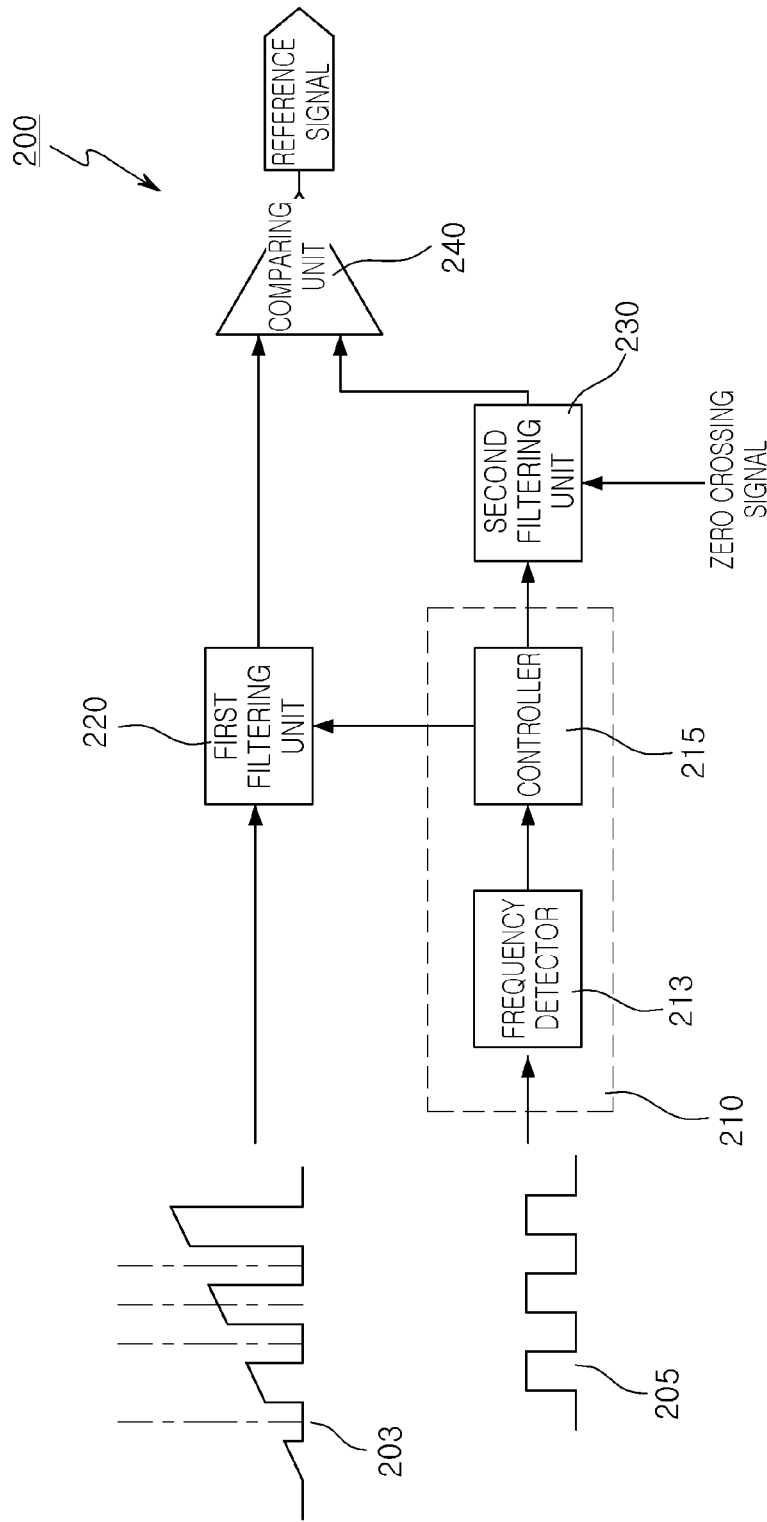
FIG. 2 is a block diagram illustrating a configuration of the motor driving apparatus shown in FIG. 1 in detail.

FIG. 2 is a block diagram illustrating a configuration of the motor driving apparatus shown in FIG. 1 in detail.

Referring to FIG. 2, a motor driving apparatus 200 according to an embodiment of the present invention may include a filter controlling unit 210, a first filtering unit 220, a second filtering unit 230, and a comparing unit 240. The first filtering unit 220 may receive a BEMF signal 205 including electrical noise and remove the electrical noise therefrom, and the second filtering unit 230 may delay a reference signal for a predetermined time. The filter controlling unit 210 may include a frequency detector 213 and a controller 215.

The frequency detector 213 may receive a pulse width modulation signal 203 and detect a frequency thereof. The frequency detector 213 may detect the frequency of the pulse width modulation signal 203 by counting a period of the pulse width modulation signal 203. The frequency detected by the frequency detector 213 may be transferred to the controller 215, and the controller 215 may generate and output a switching control signal determining cut-off frequencies of the first and second filtering units 220 and 230.

As described above, the first filtering unit 220 may be a low pass filter, and the cut-off frequency for removing the noise included in the BEMF signal 205 may be determined according to the switching control signal of the controller 215. That is, the first filtering unit 220 needs to have a tunable filter structure so that the cut-off frequency may be changed by the switching control signal output from the controller 215. Hereinafter, operations of the controller 215 and the first filtering unit 220 will be descried with reference to FIG. 3 and Table 1.

Figure 3:
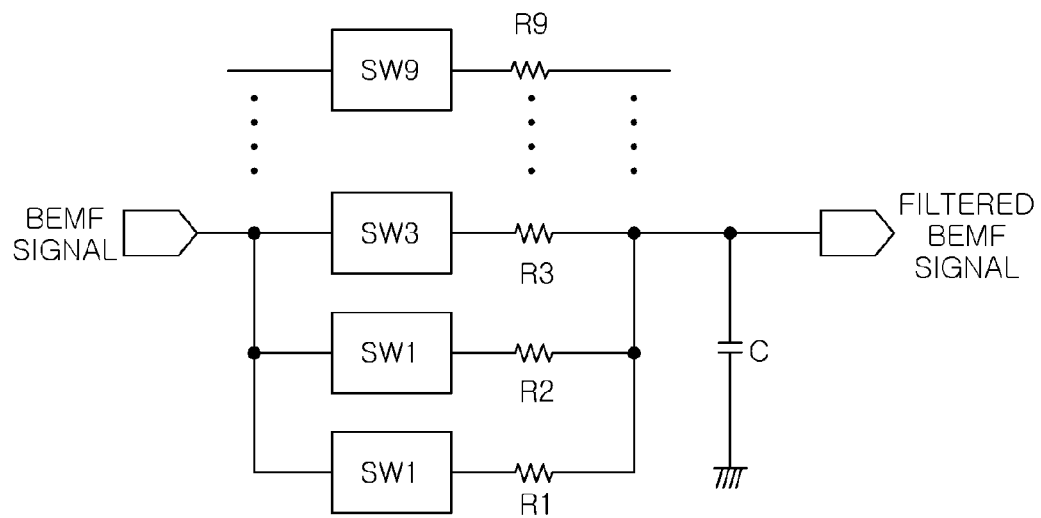
FIG. 3 is a circuit diagram illustrating an example of a circuit configuration of a filtering unit included in the motor driving apparatus according to the embodiment of the present invention.

FIG. 3 is a circuit diagram showing an example of a circuit configuration of a filtering unit included in the motor driving apparatus according to the embodiment of the present invention. The first filtering unit 120 or 220 and the second filtering unit 130 or 230 described above with reference to FIG. 1 or 2 may be configured to have the configuration of the filtering unit illustrated in FIG. 3.

Hereinafter, the first filtering unit or the second filtering unit will be commonly called as the filtering unit of FIG. 3. Referring to FIG. 3, the filtering unit according to the embodiment of the present invention may include a plurality of switching devices SW1 to SW9 and a plurality of passive devices R1 to R9 and C. In this case, resistors R1 to R9 have different values from each other. Although the case in which the filtering unit is configured to include nine switching devices, nine resistors R1 to R9, and one capacitor C is shown in the present embodiment, this configuration is only an example. That is, the filtering unit may be designed to have different configurations (for example, a plurality of capacitors and one resistor, a plurality of resistors and a plurality of capacitors, or the like). Hereinafter, for convenience of explanation, the case in which the frequency of the pulse width modulation signal varies within a range of 10 to 100 kHz will be described; however, the filtering unit and the motor driving apparatus according to the embodiment of the present invention may be used, even in a frequency of the pulse width modulation signal having a value outside of the range.

TABLE 1

| No | Frequency of Pulse Width Modulation Signal (kHz) | Turned-on Switching Device | Cut-off Frequency |
|---|---|---|---|
| 1 | 10~20 | SW1 | 0.6 f |
| 2 | 20~30 | SW2 | 0.7 f |
| 3 | 30~40 | SW3 | 0.8 f |
| 4 | 40~50 | SW4 | 0.9 f |
| 5 | 50~60 | SW5 | 1.0 f |
| 6 | 60~70 | SW6 | 1.1 f |
| 7 | 70~80 | SW7 | 1.2 f |
| 8 | 80~90 | SW8 | 1.3 f |
| 9 | 90~100 | SW9 | 1.4 f |

In order to effectively remove the noise generated by the switching operation of the pulse width modulation signal, the cut-off frequency of the filtering unit may be lower than the frequency of the pulse width modulation signal. For example, in the case in which the frequency of the pulse width modulation signal detected by the frequency detector 213 is 35 kHz, a third switching device SW3 included in the filtering unit may be turned-on. Therefore, the BEMF signal received in an input terminal may be filtered through a resistor R3 and the capacitor C, and the cut-off frequency may be determined as 0.8 f according to the values of the resistor R3 and the capacitor C.

That is, as shown in FIG. 2, the filter controlling unit 210 may detect the frequency of the pulse width modulation signal 203 to determine which section of Table 1 the detected frequency is included in, generate a control signal to allow any one of the switching devices SW1 to SW9 included in the first filtering unit 220 to be turned on according to the determination result, and provide the control signal to the first filtering unit 220. The electrical noise included in the BEMF signal 203 is removed by the filtering unit configured of the resistor connected to the turned-on switching device and the capacitor, and the BEMF signal 203 from which the noise has been removed is transferred to an input terminal of the comparing unit 240.

Meanwhile, when the electrical noise included in the BEMF signal 203 is removed by the first filtering unit 220 configured of the resistor and the capacitor, the filtering operation may cause a delay for a predetermined time. In order to remove errors that may be caused due to the delay time generated in the first filtering unit 220, the second filtering unit 230 may delay a reference signal by the delay time generated in the first filtering unit 220. The errors that may be generated in zero-crossing operation of the comparing unit 240 may be significantly reduced by simultaneously delaying the reference signal by the delay time generated in the BEMF signal.

Figure 4:
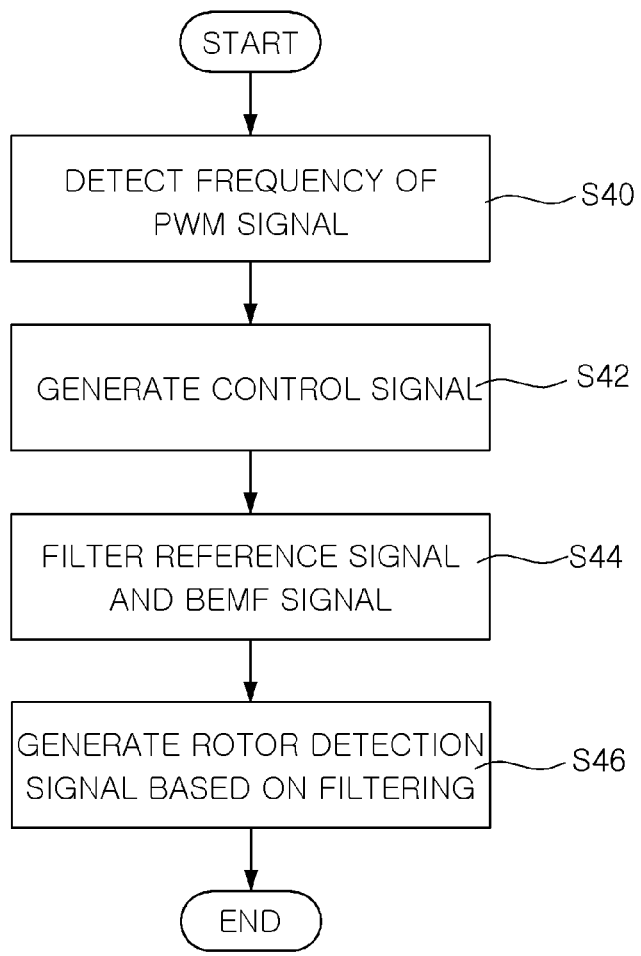
FIG. 4 is a flowchart illustrating a motor driving method according to an embodiment of the present invention.

FIG. 4 is a flowchart illustrating a motor driving method according to an embodiment of the present invention.

Referring to FIG. 4, in the motor driving method according to the embodiment of the present invention, a frequency of a pulse width modulation signal may be detected (S40). The frequency of the pulse width modulation signal may be used as a kind of reference frequency for removing noise included in a BEMF signal obtained from a floated voltage signal of a motor. That is, a predetermined control signal may be generated (S42) using the frequency of the pulse width modulation signal detected in operation S40, and this control signal may determine a cut-off frequency of the filtering unit 120 or 220 removing the noise included in the BEMF signal.

As described above, the cut-off frequency may be lower than the frequency detected in operation S40 so as to effectively remove switching noise of the pulse width modulation signal included in the BEMF signal, or the like. The first filtering unit 120 or 220 may filter the BEMF signal including the noise and the second filtering unit 130 or 230 may filter a reference signal to compensate for a delay generated by the output of the first filtering unit 120 or 220. Here, the reference signal is compared with the BEMF signal and is used to detect a position of a motor rotor using a zero-crossing method (S44).

When the BEMF signal is allowed to pass through the first filtering unit 120 or 220 in order to remove the noise therefrom, a predetermined delay by the filtering process may be reflected on the BEMF signal while simultaneously removing the noise. Therefore, in the present embodiment, the reference signal and the BEMF signal are simultaneously filtered and the delay time generated in the filtering process of the BEMF signal is also applied to the reference signal, whereby errors that may be generated in a subsequent calculation process may be significantly reduced.

A motor rotor detection signal may be generated using the filtered BEMF signal and the filtered reference signal (S46). The comparing unit 140 or 240 connected to the first and second filtering units may compare a rising or falling voltage of the BEMF signal with a voltage of the reference signal using the zero-crossing method, thereby generating the detection signal indicating the position of the motor rotor. Therefore, in the sensorless motor that does not include a separate hall sensor, the noise included in the BEMF signal may be removed through the filtering process, and the errors caused by the delay time generated in the filtering process may be significantly reduced, whereby the position of the motor rotor may be accurately detected.

As set forth above, according to the embodiments of the present invention, in order to remove the noise included in the BEMF signal obtained from the motor, the parameters required for the filtering of the BEMF signal may be determined based on the frequency of the pulse width modulation signal, and the BEMF signal may be filtered using the parameters. Particularly, in order to correct the errors caused due to the delay time generated by the filtering process, the same amount of delay time is reflected on the reference signal to be compared with the BEMF signal, whereby the operational state of the motor may be accurately detected.

While the present invention has been shown and described in connection with the embodiments, it will be apparent to those skilled in the art that modifications and variations can be made without departing from the spirit and scope of the invention as defined by the appended claims.

What is claimed is:

1. A motor driving apparatus comprising:
   a filter controller detecting a frequency of a pulse width modulation (PWM) signal and generating a control signal;
   a first filter filtering a back electromotive force (BEMF) signal according to the control signal;
   a second filter filtering a reference signal according to the control signal; and
   a comparator comparing output of the first and second filters and generating a motor rotor detection signal,
   wherein the filter controller determines a cut-off frequency of at east one of the first and second filters based on the frequency of the PWM signal.

2. The motor driving apparatus of claim 1 wherein the first and second filters have the same delay time.

3. The motor driving apparatus of claim 1, wherein the second filter delays a direct current voltage or a neutral point voltage according to the control signal and outputs the reference signal delayed by the same amount as the output of the first filter.

4. The motor driving apparatus of claim 1, wherein the comparator compares the output of the first and second filters and outputs a zero crossing signal.

5. The motor driving apparatus of claim 1, wherein the first and second filters include:
   a plurality of switching devices of which an on/off operation is controlled by the control signal; and
   at least one delay device connected to the plurality of switching devices.

6. A motor driving apparatus comprising:
   a filter controller including a frequency detector detecting a frequency of a pulse width modulation (PWM) signal and a controller generating a switching control signal using the frequency of the PWM signal; and
   a filter filtering a back electromotive force (BEMF) signal according to a cut-off frequency determined based on the control signal,
   wherein the filter controller determines the cut-off frequency of a plurality of filters included in the filter based on the frequency of the PWM signal.

7. The motor driving apparatus of claim 6, wherein the filter includes:
   a plurality of switching devices operated by the switching control signal; and
   at least one passive circuit device connected to the plurality of switching devices.

8. The motor driving apparatus of claim 7, wherein the controller controls turning-on or turning-off of each of the plurality of switching devices according to the frequency of the PWM signal.

9. A motor driving method comprising steps of:
   detecting a frequency of a pulse width modulation (PWM) signal;
   generating a control signal based on the frequency of the PWM signal;
   filtering a back electromotive force (BEMF) signal based on the control signal; and
   generating a zero crossing signal using a reference signal delayed based on the control signal and the filtered BEMF signal,
   wherein the step of filtering the BEMF signal is performed by low pass filtering with respect to the BEMF signal using a cut-off frequency determined based on the control signal.

10. The motor driving method of claim 9, wherein the step of generating the zero crossing signal is performed by comparing the delayed reference signal and the filtered BEMF signal with each other.

11. The motor driving method of claim 9, wherein the delayed reference signal has the same delay time as that of the filtered BEMF signal.

12. The motor driving method of claim 9, wherein the step of filtering the BEMF signal includes controlling an operation of each of a plurality of switching devices according to the control signal and determining the cut-off frequency.

* * * * *